June 21, 1960

J. GELLER ET AL 2,941,871

HORIZONTAL COUNTER-CURRENT LIQUID EXTRACTOR

Filed Nov. 30, 1956

HORIZONTAL COUNTER-CURRENT LIQUID EXTRACTOR

Julius Geller, Bad Homburg vor der Hohe, and Adolf Hupe, Frankfurt am Main, Germany, assignors to Rütgerswerke-Aktiengesellschaft, Frankfurt am Main, Germany Filed Nov. 30, 1956, Ser. No. 625,296

Claims priority, application Germany Dec. 3, 1955

7 Claims. (Cl. 23—270.5)

This invention relates to the extraction of liquids and it has particular relation to the extraction of two liquid phases of different specific gravity.

According to the present state of the art, two fundamentally different processes for fluid-fluid extraction of liquids are known.

In one of these processes the different specific gravities of the phases are utilized in order to pass one of the phases through the other, or along the other. In some devices for carrying out these processes gravitational forces are used for causing movement of the liquids—e.g. in columns provided with perforated plates, bubble tray columns, columns containing filling bodies, spray towers (see for example U.S. Patent No. 2,364,892), towers provided with rotating plates (see for example U.S. Patent No. 2,601,674)—while some other devices utilize centrifugal forces which act on the phases in a rotating system, as an example of which the Podbielniak-extractor is mentioned (see Bulletin No. 30 of Podbielniak Inc., Chicago, Illinois). Thereby in each case the heavier phase displaces the lighter phase in a direction opposite to the gravitational forces or centrifugal forces, respectively, or, due to a drop or incline, the two phases slide along each other in the direction of the gravitational or centrifugal forces, for example in the Van Dijck extractor (see U.S. Patent No. 2,266,521), the Signer extractor (see German Patent 903,688) and the Sharples extractor (see Chem. Eng., February 1954, 284). In some of the devices, pulsating movements are imparted to the phases in order to improve the exchange of material, while in other devices the phases are mixed in stages with each other.

In said second procedure, the phases are mixed with each other in each case in direct current and are subsequently separated from each other and then passed to the next stage in countercurrent. Thereby, mixing is brought about, for example, by means of pumps, or stirring devices, while separation is effected in settling vessels, Florentine receivers or rotating separators. In one of the known devices, several of these mixing stages and separating stages are included in a rotary device (the Coutor-Lurgi-extractor, see German Patent No. 706,971 and British Patent 739,112).

In order to carry out the first mentioned procedure with the utilization of gravitational forces only, large devices capable of holding large volumes of liquid are necessary, because the velocity of the throughput—which is dependent on the difference of the specific gravities—and the exchange of material too, are low in the individual stages. In devices based on the use of centrifugal forces, the throughput may be relatively high, but the number of stages has to be low, because the maximum diameter and the over-all length in axial direction, of the devices are limited for practical reasons.

If in the second of the above mentioned fundamental processes only separating steps which utilize gravitational forces are used, the apparatus must be of large dimensions and requires large volumes of liquid. By using in the individual separating stages rotating separators, the velocity of the throughput can be kept high and the amount of liquid in the apparatus can be kept low, but this advantage is obtainable in an extremely complicated apparatus only.

The above mentioned disadvantages are eliminated to a great extent in the process of the present invention and in the device for carrying out said process, so that in an uncomplicated apparatus of small volume, a high throughput can be obtained practically at any desired high number of stages.

According to the present invention, the two phases are caused to rotate in a hollow cylinder, so that the two phases are spread on the inner surface of the cylinder in two substantially concentrical layers superposed one upon the other. Within the hollow cylinder, circular ring-shaped stage separator discs are radially arranged, which are provided with a central opening for the axial passage of the light phase. On the outer periphery of said separator discs channels are provided for permitting unobstructed transport of the heavy phase in axial direction. Due to the design of these channels according to the present invention, at a countercurrent passage parallel to the axis, the heavy phase is forced to flow stepwise between two separator walls in each case in direct current relative to the light phase, subsequently, however, in two stepwise sections, to flow in opposite direction, i.e. in countercurrent relative to the light phase. The totally necessary countercurrent of the two phases is produced by a corresponding supply and discharge, respectively, of the two phases at the ends of the hollow cylinder.

Rotation of the two phases in the interior of the hollow cylinder can be brought about either by rotation of the hollow cylinder with the separating discs and channels, or by rotation of stirring members or paddles provided on a shaft located within the hollow cylinder.

A particularly high efficiency is attained by stirring up both phases by means of built-in elements at least at the start of each direct current path. The disturbance or turbulence of the phase-separating surface, or the partial mixing of the phases results in a satisfactory material exchange between the phases.

During the further course of the direct current sections in the individual steps or stages, the phases are completely separated again from each other under the action of the centrifugal force.

By the use of suitable designs, the stirrer members and paddles can be enabled to obtain a transport effect in axial direction. Particularly in the case of elongated systems with a high number of steps or stages the velocity of throughput can be thus essentially increased. Thereby, the stirrer elements or paddles can be moved with a number of rotations which is different from that of the rotation of the system or they can stand still. In the case of tilted paddles which rotate uniformly with the hollow cylinder, a slight transport effect in axial direction results, because the speed of rotation in the liquids increases in inward direction.

The direct current and the countercurrent of the two phases in the individual steps or stages is obtained due to the fact that the radial stage separating walls prevent only the heavy phase from directly passing to the next step or stage. The central openings in the separating walls permit only the light phase to flow in an uninterrupted equidirectional flow through all stages. The channels provided on the outer periphery of the separating walls for the heavy phase extend in each case close up to the two adjacent separating walls, whereby this phase is forced to deviate in the range of each stage from the totally determined countercurrent direction and to flow in direct current with the light phase between two separating walls in each case.

If the hollow cylinder proper rotates, the mixing of the phases at the start of each direct current section of a step can be effected by built-in elements which are preferably symmetrical with respect to rotation and have the design of perforated discs, star-type impellers, toothed ledges, which are axially parallel or worm-shaped, have solid or perforated walls and may be arranged, if desired, in pairs with opposite pitch, or distributed individual plugs. The latter are either connected with the hollow cylinder proper and rotate together with it, or are arranged on a separate shaft in the interior of the cylinder and rotate with a different number of rotations, or stand still.

In a hollow cylinder which stands still and is provided with separating walls and channels, such built-in elements bring about by their rotation the necessary rotating movement of the phases. Said built-in elements extend in their radial dimension either in one single phase, or at least in the range of the phase separation layer in the two layers of liquid. These built-in elements can occupy within each step or stage a limited axial space or the total length of the step or stage. It is preferred to use built-in elements with different speed of rotation for intensive mixing at the start of each direct current section in one stage and to use built-in elements which rotate with a velocity equal to the rotation of the phase for quieting the phases in the remaining part of the stages.

With high expenditure for the apparatus, a particularly intensive material exchange can be obtained on the boundary surface by non-uniform rotation of the hollow cylinder and the built-in elements, respectively. However, in general this can be dispensed with, because the material exchange resulting from uniform stirring is sufficient in most cases.

The liquid phases are supplied at the ends of the cylinder in such a manner that the desired countercurrent or direct current of the phases through the extraction zone results. Thereby the supply tubes can be introduced either outside the shaft directly into the interior space of the cylinder, or through the shaft into the interior space, or into the shaft which in this latter case must be provided with corresponding openings for the entrance of liquid into the extraction zone.

The mixture of liquids, which has to be separated if desired, can be introduced fundamentally in the same manner as the phases. However, it is of advantage to arrange the tube for its introduction adjustably in the axial position. Thereby, the openings of the shaft and the end of the supply tube should be made in such a manner that the liquid enters the zone of extraction at "one" defined place only. For this purpose, separating rings applied to the shaft and drip rings at the end of the supply tube can be used.

According to the invention, the phases can be withdrawn at the ends of the extraction zone in various manners:

(a) By means of overflow weirs which may be rotating or stationary,
(b) By means of stationary skimming tubes,
(c) By means of valves which are stationary, but may be rotating in exceptional cases.

The overflow weirs terminate the interior space of the cylinder in their use in axial direction, at the ends. They have the form of concentric rings or ring sections which are preferably exchangeable or radially adjustable. While on the discharge side of the light, inner phase a simple overflow weir is sufficient, on the discharge side of the outer, heavy phase the insertion of a lower flow weir, of the type known from decanting, is necessary.

The liquids flowing over the weirs are received in suitable annular cups or trays which are arranged around the weirs and in general stationary, and the liquids are discharged therefrom. In order to avoid loss of liquids, the annular cups or trays can be provided with antechambers and slinger rings.

It has been found to be of considerable advantage to discharge the phases from the extraction zone by means of skimming tubes of the type known in centrifuging. While an adjustment of overflow weirs in order to change the thickness of individual phase layers is possible in general at a standstill of the apparatus only, the same effect can be obtained by means of skimming tubes in simplest manner, for example by means of lead screws, during operation. The skimming tubes are introduced into the interior space of the container at the ends thereof in such a manner that they skim the liquid from the free surface of a rotating liquid layer. By adjusting the depth of the top edge of the tube, the radial position of the liquid level is adjusted and determined. Upon effecting throttling in a skimming tube by means of a valve, or the like, a skimming tube can be also used for taking off liquid from the depth of a rotating layer or from the outer layer of two superposed layers. However, it is preferred to place in front of the skimming tube for the heavy outer phase a lower flow weir so that also the liquid of this phase can be skimmed from the free surface thereof.

The use of valves for the discharge of liquids is preferred in cases in which they can be connected to non-rotating parts of the system. However, in apparatus operated under excess pressure, in some cases the valves must be arranged on rotating parts too, if an unobjectionable control can be attained in this manner only. The valves are controlled either in dependence on the position of the phase-liquid level or in dependence on the pressure of the liquid content.

By means of skimming tubes it is also possible, if desired, to withdraw partial streams of the phases from a middle range of the extraction zone.

In order to obtain satisfactory separation of the phases from each other at the ends of the extraction zone, conical separating surfaces can be arranged in front of the overflow weirs, lower flow weirs and skimming tubes, in the direction of transport of the phases to be decanted.

Due to the supply and discharge of the individual phases, at the opposite ends of the cylinder in each phase in axial direction a drop or incline occurs, which is dependent on the magnitude of the centrifugal forces, and in vertical arrangement also on the gravitational forces, on the amount of the throughput and the flow resistance caused by the built-in elements. This drop causes the axial flow of the two phases in countercurrent to each other and in direct current with each other, respectively. In particularly elongated systems, in which simultaneously a high throughput performance is required, the built-in elements can be carried out in such a manner that they bring about an additional transport of the phases in the desired axial direction. In this connection it has been found that particularly useful built-in elements are those consisting of worms, worm sections or paddle plates arranged in inclined position relative to the direction of the axis. Such paddles can be arranged in simple manner, for example on perforated discs. In order to obtain the desired transport effect a tangential relative movement of the built-in elements relative to the liquid is necessary. In the case of built-in elements which rotate together with the rotating casing, it may be sufficient to utilize the rotation velocity of the liquids, which increases in inward direction. However, it is of advantage to use built-in elements which either rotate with a different number of rotation or stand still. In systems provided with a stationary hollow cylinder and rotating built-in elements, the latter may be utilized for the transport of liquids. Thereby in each case the pitch of the paddles or worm sections in the phases, must correspond to the relative velocity and the desired velocity of throughput. Fundamentally, it is possible to use the same built-in elements for the transport of phases and for stirring up of the separating layer. However, built-in elements of the two types may also be combined with each other.

The devices according to the present invention can be provided with rotating or standing still devices, by means of which the operating temperatures in the system can be regulated in the desired manner, for example if the extraction has to be carried out at elevated or low temperature.

The process according to the present invention and the device for carrying out said process can be used for washing liquids with liquids in countercurrent and also for two-phase countercurrent extraction in order to separate a specific mixture of liquids. Furthermore, it is also possible to carry out according to the present invention reactions, in which liquids must be conducted in close contact with liquids in countercurrent.

The appended drawings illustrate by way of example and without limitation some embodiments of and a best way for carrying out the process and the device of the invention.

Figure 3:
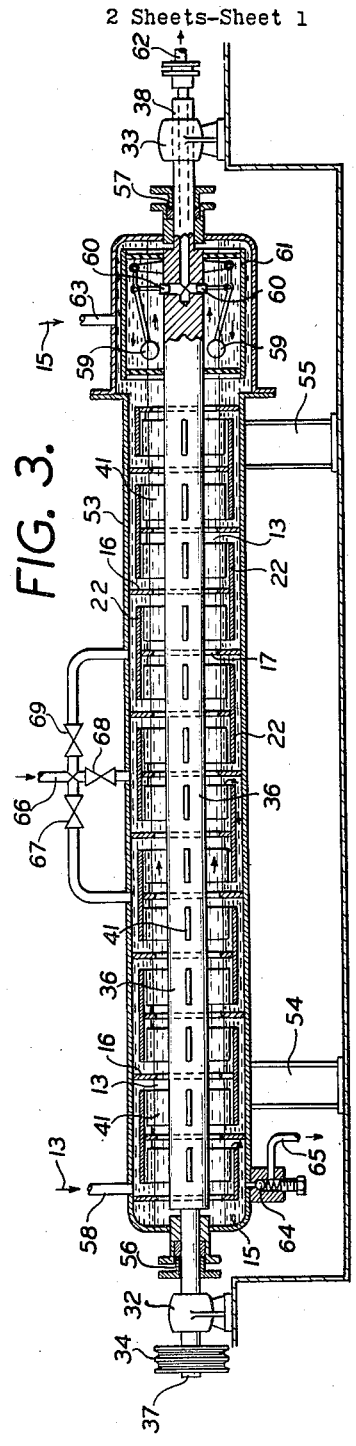

Fig. 3 illustrates a device in which the cylindrical casing as well as the separating walls and channels are stationary. The interior space is completely filled with liquid. The built-in elements rotate and carry forward the liquids. The phases are discharged through valves. This device is particularly suitable for extractions under excess pressure.

Figure 4:
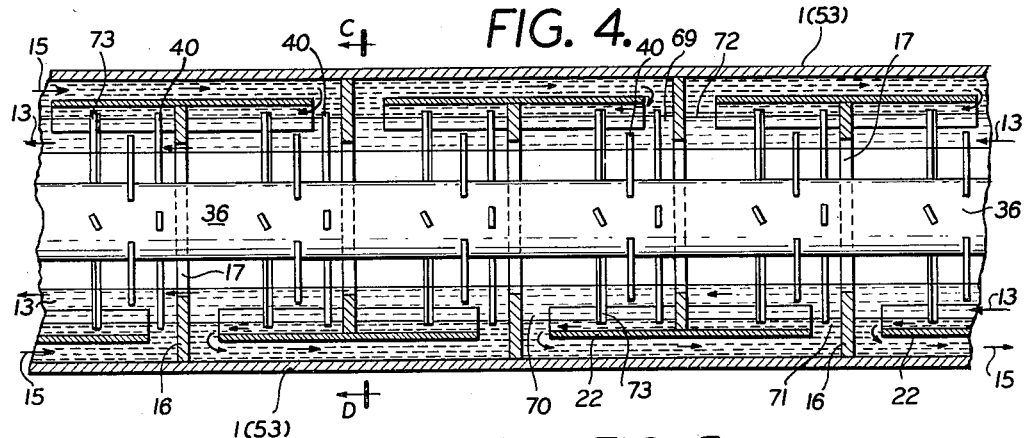
Figure 5:
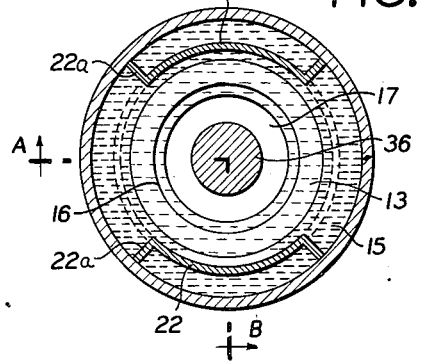

Figs. 4 and 5 represent sectional views parallel to the axis and in radial direction, respectively, through a section of the extraction zone with separating walls, countercurrent channels and built-in elements. Figure 4 is a section taken along the line A—B of Fig. 5 which is a section taken along the line C—D in Fig. 4.

Figure 6:
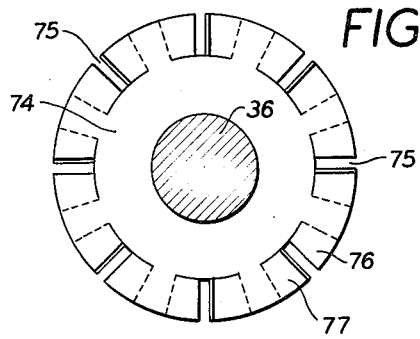
Figure 7:
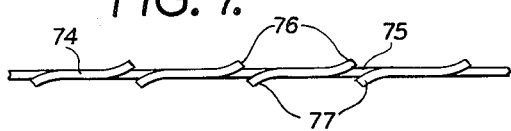

Figs. 6 and 7 show an axial and a radial view of a built-in disc which is used for quieting the phases after mixing and for transporting phases in axial direction.

Figure 1:
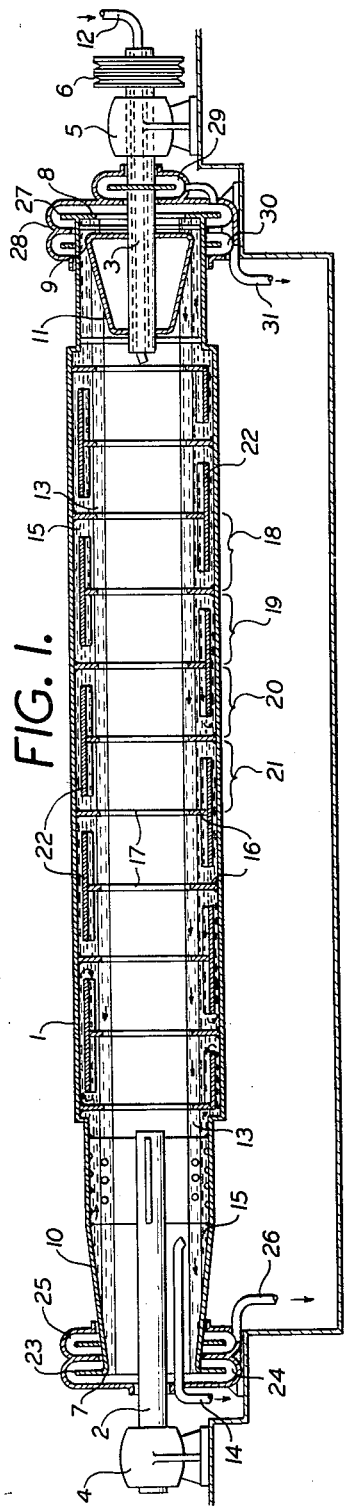
Fig. 1 illustrates a complete extraction device provided with a rotating hollow cylinder, stage separating walls and countercurrent channels, fixedly connected with the cylindrical casing, whereby the phases flow over weirs.

Referring now to the drawings in detail, in Fig. 1 reference numeral 1 denotes the casing of the container which is fixedly connected with the shaft journals 2 and 3. The latter are rotatably arranged in bearings 4 and 5 so that casing 1 is capable of rotating about its horizontal axis. Rotation is brought about over the belt pulley 6 which is arranged on the end of shaft 3.

At one of its ends, container jacket 1 is closed by the overflow weir 7. At the other end casing 1 is closed by overflow weir 8, in front of which the lower flow weir 9 is arranged. In front of the overflow weir 7 and the lower flow weir 8, the conical separating surfaces 10 and 11 are arranged.

The supply tube 12 for the light phase 13 is here passed, by way of example, through the shaft journal 3 and extends up to and into the extraction zone. The supply tube 14 for the heavy phase 15 projects directly from the opposite side into the container casing 1. Altogether, the phases 13 and 15 move in counter-current relative to each other through the apparatus. The light phase 13 passes through the central openings 17 provided in the radial separating walls 16 from one stage 18 to the subsequent stage 19 and the further stages 20, 21, etc., in straight flow. Along casing or jacket 1, through the separating walls 16 channels 22 are formed, through which the heavy phase 15 is passed in each case by the length of two stages (for example 19, 20) in the opposite direction. Due to the passage in direct current of the two phases 13, 15 in each individual stage, altogether a countercurrent of the two phases is thus obtained. (A description in detail of the passage of both liquid phases will be found in the description of Figs. 4 and 5 further below.) During the stagewise direct current passage, the extract enters from one phase into the other. The whirls formed in the heavy phase 15 during discharge from the channels 22 support the procedure of extraction.

After passing the extraction zone, the light phase 13 flows over the overflow weir 7 and is thrown from the edge 23 into the collecting chamber 24. The light liquid 13 is discharged through discharge tube 26, eventually together with liquid flowing together in drip chamber 25.

The heavy phase 15 passes after the extraction zone first the lower flow weir 9 and then the overflow weir 8. From the edge 27, the liquid 15 is thrown into chamber 28 and from the latter it is discharged through discharge tube 31, together with liquid 15 flowing together from drip chambers 29, 30.

Figure 2:
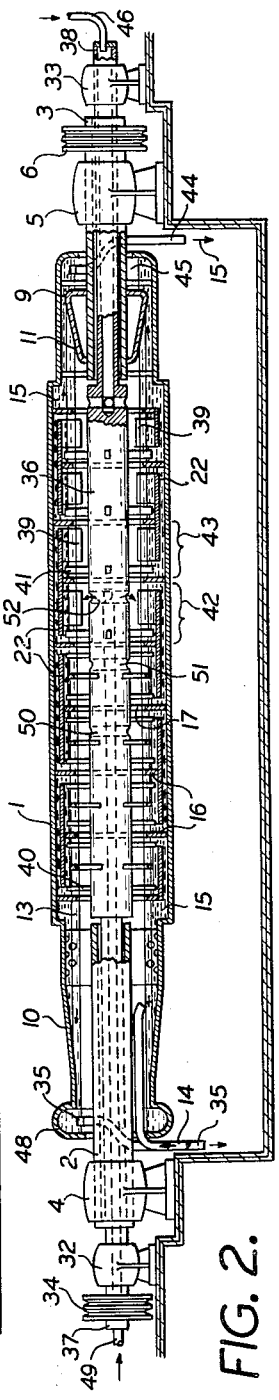
Fig. 2 illustrates a complete device provided with a rotating hollow cylinder and separately rotating built-in elements and with skimming tubes for the withdrawal of phases.

In Fig. 2 the casing 1 is journalled rotatably with its shaft journals 2 and 3 in bearings 4 and 5. In the interior of casing 1 the built-in shaft 36 is likewise rotatably arranged, said shaft having ends 37, 38 which are arranged in bearings 32 and 33. Casing 1 is driven by belt pulley 6 and shaft 36 is driven by belt pulley 34. Within casing 1 radial stage separating walls 16 are fastened and provided with central openings 17. At the outer periphery separating walls 16 are perforated by one or more axial channels 22, which extend in each case closely to the adjacent stage separating walls. In the right portion of Fig. 2 baffle plates 39 are arranged in radial direction in the individual stage sections and said baffle plates rotate together with the casing. On the built-in shaft plugs 40 or star-type impellers 41 are seated.

The heavy phase 15 enters the extraction zone in casing 1 through supply tube 14, passes through the extraction zone and is discharged after passing the conical separating surface 11 and the lower flow weir 9, through the skimming tube 44 from the skimming chamber 45. The light phase 13 is introduced through the supply tube 46 through the hollow shaft journal 38 and the openings provided in the built-in shaft, into the extraction zone. After leaving the extraction zone the light phase is caused to pass over the conical separating surface 10 and is subsequently withdrawn through the skimming tube 35 from the skimming chamber 48.

Like in Fig. 1, the light phase 13 passes within the extraction zone from one stage 43 through the openings 17 provided in the separating walls 16 to the next stage 42. The heavy phase 15 moves between two adjacent separating walls 16 in direct current with the light phase 13. However, it is then conducted through channels 22 backward by two stage lengths so that altogether a countercurrent of the two phases 13, 15 results. Within the direct current sections of the stages, the two phases 13, 15 are intimately mixed through plugs 40 or the star-type impellers 41. It has been found that the arrangement in the right portion of Fig. 2, for example in stages 42 and 43, is particularly advantageous. In the latter the phases are mixed merely directly after the entrance in the direct current sections of stages 42, 43 by the star-type impellers 41, while the paddles 39, which rotate together with casing 1, provide for sufficient separation of the phases by uniform rotation.

If it is desired to separate a mixture of liquids by a two-phase countercurrent extraction by means of two solvents, into two components or groups of components, the mixture can be fed through the supply tube 49, which is displaceable in the hollow built-in shaft, into one of the middle stages. The discharge opening provided at the end of tube 49 can be aligned selectively with one of the shaft perforations 50, 51, 52, whereby the supply stage for the mixture to be separated is determined.

In Fig. 3 the container casing 53 which is stationary, is arranged on supports 54 and 55. In the interior of the casing, shaft 36 rotates which is rotatably arranged by its shaft journals 37 and 38 in bearings 32 and 33. The shaft 36 is driven over V-belt pulley 34. The stuffing boxes 56 and 57 seal the passages of the shaft in casing 53.

The stage separating walls 16 provided with central openings 17 are likewise stationary and arranged in casing 53. At the outer periphery the walls 16 are perforated by channels 22 which extend close to the two adjacent walls 16 in each case. The paddles 41, which likewise rotate, are seated on shaft 41.

The light phase 13 is introduced into the extraction zone through tube 58 and flows along shaft 36 through openings 17 in the walls from stage to stage up to the valves 60 which are controlled by the floats 59. The floats 59 and the valves 60 rotate within cages 61 connected with shaft 36, together with shaft 36. The weight of floats 59 is selected in such a manner that they float within the separating layer of the phases. From the valves 60, the light phase 13 flows through the tube 62 which is sealed toward the shaft 36.

The heavy phase 15 is introduced through the tube 63. It flows in each case through the channels 22 by two stage lengths forward in the direction of the opposite end of the extraction zone and subsequently in each case in direct current with the light phase backward by one stage length. By the rotating paddles 41, both phases 13, 15 are caused to vigorously rotate, whereby at each start of a direct current section a strong mixing of both phases 13, 15 and toward the end of such a section an almost complete separation of the phases 13, 15 is brought about. While the light phase is conducted through the entire casing with almost uniform rotation, the heavy phase 15 is always alternately caused to rotate in the direct current sections and to pass in the countercurrent sections in the channels 22 without rotation. At the end of the extraction zone the heavy phase 15 leaves the casing 53 through the spring-loaded, pressure-controlled valve 64 and tube 65.

A mixture—which may have to be separated if desired—can be fed selectively through one of the valves 67, 68, or 69 into the middle portion of the extraction zone. The embodiment illustrated in Fig. 3 is particularly suitable for operation under excess pressure.

The Figs. 4 and 5 show in an axial section and in a radial section through a portion of the extraction zone the exact path of the two phases 13 and 15. In the casing 1 (53)—which is either rotatable or stationary—separating walls 16 provided with central openings 17 are arranged. The axial channels 22 are located at the outer periphery and have radially outward bent ribs 22a. The light phase 13 flows from the right to the left in the drawing through the openings 17 in the walls from stage to stage, for example from the entrance 71 to the exit 72 of one stage and further to entrance 69 and exit 70 of the next stage and so on. The heavy phase 15 moves from entrance 69 through the direct current section to exit 70 of one stage, then through channel 22 by two stage lengths to the entrance 71 of the next backward located stage and then to the exit 72 of the latter and so on. By the plugs 40 which rotate together with the shaft 36, mixing of the two phases 13, 15 is brought about in each case at the entrance 69, 71 of a stage. The tilted paddles 73 on the shaft 36 drive the phases in addition to the effect of the axial drop of the phase levels through the extraction zone. In each case up to the exit 70, 72 of a stage a practically complete separation of the phases 13, 15 is obtained, due to centrifugal effect.

The Figs. 6 and 7 show an axial view and a radial view, respectively, of a built-in disc 74 which is either arranged fixedly on the shaft 36 or fixedly in casing 1, 53. Along the periphery the disc 74 is provided with perforations 75, the edges 76, 77 are bent upward in such a manner that the relative movement of the disc 74 toward phases 13, 15 yields a transport effect for the phases 13, 15 through the extraction zone. Such discs 74 can be preferably used for being built-in close behind the plugs 40 or paddles 41, which bring about mixing of the phases 13, 15— in the direct current section, in which they contribute to quieting the phases mixed with each other.

The following examples illustrate some applications of the extraction process and the devices according to the present invention.

An apparatus substantially corresponding to the apparatus illustrated in Fig. 2 was operated with various built-in structures. The interior diameter of the container casing 1 amounted to 200 mm., and the length of the extraction zone between the inner ends of the conical separating surfaces 10 and 11 amounted to 1950 mm. The extraction zone consisted of a total of 12 stages or steps 42, 43, each of which had a length of 150 mm. Each of the stage separating walls 16 was provided with two oppositely arranged channels 22. (See also Fig. 5.)

*Example 1*

In the absence of separately rotating built-in elements, a device substantially corresponding to Fig. 1, was operated with an overcritical number of revolutions of 3000 revolutions per minute. Thereby on the inner surface of the casing a value amounting to 250 times of the acceleration of gravity could be attained. The two skimming tubes were adjusted in such a manner that within the walls of the channels 22 thicknesses of the layers per phase, amounting in the average to 15 mm., resulted. Water which contained 2.5% of phenol was used as the heavy phase. In countercurrent to the latter, pure benzene was fed as the light phase. The entire system had a temperature of about 90° C. In preliminary, purely load tests, pure water and benzene were used at 19° C. Thereby, it was unexpectedly found that the throughput in the device described could be increased simultaneously up to 520 liters per minute of the light phase and up to 400 liters per minute of the heavy phase. Above these values no satisfactorily decanted phases could be withdrawn from the skimming tubes.

In the operation of the device with phenol-containing water, only an amount of 320 liters per minute and an amount of 190 liters per minute of benzene were put through in countercurrent. At this load, a theoretical exchange step number of four units was attained. Thus the degree of efficiency per step amounted in the average to 50%.

*Example 2*

The device according to Example 1 was provided according to the right portion of Fig. 2 with a shaft 36, 4 paddles 41 per step and 4 baffle plates 39 per step. At the same load as in Example 1, at a number of revolutions of the cylinder of 3000 per minute and a number of revolutions of the shaft 36 of 2880 per minute in the same direction—i.e. at a difference of 120 in the number of revolutions—a theoretical step or stage number of 12 was found, which thus was completely corresponding to the practical number of stages or steps. In this case an efficiency of 100% could be attained. At a number of revolutions of the shaft of 2400 per minute, i.e. at a difference of 600 per minute, a theoretical stage or step number of 10 resulted. In direct current operation of the two system parts only 8 stages could be attained. The reduction of the number of stages in the case of numbers of difference in revolution, which exceed the optimum, was probably due to a too intensive mixing in the stages and an insufficient separation in the direct current sections.

It will be, of course, understood that the above examples do not limit the range of applications of the process and device according to the present invention and that any desired kind of extraction process can be carried out according to this process in the corresponding devices.

It will be also understood that this invention is not limited to the specific procedures and devices described above and illustrated in the drawings and can be carried out with various modifications without departing from the scope of the invention as defined in the appended claims.

It will be understood that the liquids to be treated according to the invention are substantially not miscible with each other. For the sake of convenience the phase of lower specific gravity and the phase of higher specific gravity were denoted "light phase" and "heavy phase," respectively.

What is claimed is:

1. An extraction device for operation with two liquid phases, one of which is a lighter phase having a lower specific gravity and the other is a heavier phase having a higher specific gravity, said device comprising a container for said phases, having a tubular wall and a longitudinal axis and being capable of rotation, whereby the heavier phase tends to move nearer to said tubular wall than the lighter phase; means for rotating said container; a supply duct for the lighter phase, leading to an inner point of said container near one end of the latter, a discharge duct for the lighter phase, leading from an inner point near the other end of said container; a supply duct for the heavier phase, leading to an inner point of said container near said other end thereof; a discharge duct for the heavier phase leading from an inner point near said one end of said container, whereby said first and second phase pass through said container in opposite directions; annular disk-like members extending from said tubular wall, perpendicularly to said axis of the container, inwardly in radial directions, dividing said container into a series of stage chambers, having central cutouts substantially for the passage of said lighter phase and having along the periphery arc-shaped cut-outs for the passage of said heavier phase; said arc-shaped cut-outs of each annular wall being staggered relative to the cut-outs of the adjacent annular disk-shaped members; channel walls extending parallel to and spaced from said tubular wall perpendicularly to said annular disk-like members, each having a middle connected to one of said annular disk-shaped members along the circumference of said arc-shaped cut-outs, having ends terminating at a short distance from the annular disk-shaped members adjacent said connected disk-shaped member, and having at their longitudinal edges bent ribs extending up to the wall of the container whereby the heavier phase moving through said cutouts along said tubular wall is, at the end of said channel wall, forced by meeting an annular disk-like member to move inwardly and then parallel to said lighter phase.

2. A device according to claim 1 further comprising baffle plates extending from said channel walls in radial inward directions and rotating with said container.

3. A device according to claim 1 further comprising a shaft passing co-axially through said container and being rotatable independently from the rotation of said container; means for rotating said shaft and mixing elements affixed to said shaft and having radially extending arms.

4. A device according to claim 1, further comprising a shaft passing co-axially through said container and being rotatable independently from the rotation of said container; means for rotating said shaft, mixing elements affixed to said shaft and having radially extending arms; and plates, each extending from one of said channel walls inwardly and having lateral surfaces extending in axial direction of said container between and spaced from one of said annular walls and one of said mixing elements, whereby said plates rotate said phases and also guide said phases in axial direction.

5. A device according to claim 1, further comprising a supply duct for a mixture of at least 2 components to be separated from each other, said duct leading to an inner point near the center of said container.

6. A device according to claim 1, further comprising a shaft passing co-axially through said container and being rotatable independently from the rotation of said container and means for rotating said shaft; mixing elements affixed to said shaft and having radially extending arms; said shaft having an axially extending bore and a radial outlet connecting said bore with one of said chambers; and a duct for a mixture of said two phases leading through said bore and said outlet.

7. A device according to claim 1, further comprising a shaft passing co-axially through said container and being rotatable independently from the rotation of said container and means for rotating said shaft; and paddles affixed to said shaft, extending toward said channel walls and being propeller-like tilted, whereby said paddles drive said phases in axial direction of said container.

References Cited in the file of this patent

UNITED STATES PATENTS

| | | |
|---|---|---|
| 1,353,463 | Dyer | Sept. 21, 1920 |
| 1,940,585 | Fauth | Dec. 19, 1933 |
| 2,036,924 | Coutor | Apr. 7, 1936 |
| 2,088,497 | Tymstra | July 27, 1937 |
| 2,121,324 | Manley | June 21, 1938 |
| 2,569,391 | Stearns | Sept. 25, 1951 |
| 2,765,298 | Signer | Oct. 2, 1956 |
| 2,778,717 | Decker | Jan. 22, 1957 |